(12) United States Patent
Ikonen et al.

(10) Patent No.: US 12,554,066 B2
(45) Date of Patent: Feb. 17, 2026

(54) WAFER WITH BURIED V-GROOVE CAVITY FOR FIBER COUPLING

(71) Applicant: ROCKLEY PHOTONICS LIMITED, Altrincham (GB)

(72) Inventors: Janne Ikonen, Espoo (FI); John Paul Drake, St. Ives (GB); Henri Nykänen, Helsinki (FI); Damiana Lerose, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 298 days.

(21) Appl. No.: 18/266,565

(22) PCT Filed: Dec. 10, 2021

(86) PCT No.: PCT/EP2021/085239
§ 371 (c)(1),
(2) Date: Jun. 9, 2023

(87) PCT Pub. No.: WO2022/123031
PCT Pub. Date: Jun. 16, 2022

(65) Prior Publication Data
US 2024/0053551 A1 Feb. 15, 2024

(30) Foreign Application Priority Data
Dec. 11, 2020 (GB) ...................................... 2019591

(51) Int. Cl.
*G02B 6/136* (2006.01)
*G02B 6/12* (2006.01)
*G02B 6/30* (2006.01)
*G02B 6/36* (2006.01)
*G02B 6/42* (2006.01)

(52) U.S. Cl.
CPC .............. *G02B 6/136* (2013.01); *G02B 6/30* (2013.01); *G02B 6/42* (2013.01); *G02B 6/423* (2013.01);
(Continued)

(58) Field of Classification Search
CPC . G02B 6/30; G02B 6/423; G02B 6/42; G02B 6/3652; G02B 6/3636; G02B 6/136;
(Continued)

(56) References Cited

U.S. PATENT DOCUMENTS

| 5,644,667 | A | * | 7/1997 | Tabuchi | ............... | G02B 6/1221 |
| | | | | | | 385/83 |
| 6,316,281 | B1 | * | 11/2001 | Lee | ........................ | G02B 6/136 |
| | | | | | | 438/31 |

(Continued)

FOREIGN PATENT DOCUMENTS

| CN | 112034567 A | 12/2020 |
| EP | 4 028 806 | 4/2021 |

OTHER PUBLICATIONS

Combined Search and Examination Report for GB 2019591.3 dated Aug. 10, 2021, 10 pages.
(Continued)

*Primary Examiner* — Michelle R Connelly
(74) *Attorney, Agent, or Firm* — Womble Bond Dickinson (US) LLP

(57) ABSTRACT

A wafer with a buried V-groove cavity, and a method for fabricating V-grooves. In some embodiments, the method includes bonding a first layer, to a top surface of a substrate, to form a composite wafer, the first layer being composed of a first semiconductor material, the substrate being composed of a second semiconductor material, the top surface of the substrate having a cavity, the cavity including a V-groove.

12 Claims, 14 Drawing Sheets

(52) U.S. Cl.
CPC ......... *G02B 6/4239* (2013.01); *G02B 6/4243* (2013.01); *G02B 2006/12061* (2013.01); *G02B 6/3636* (2013.01)

(58) Field of Classification Search
CPC .. G02B 6/4243; G02B 6/3692; G02B 6/4224; G02B 2006/12061; G02B 6/12; G02B 6/305; G02B 2006/12176; G02B 2006/12147; G02B 6/4239
See application file for complete search history.

(56) References Cited

U.S. PATENT DOCUMENTS

| | | | |
|---|---|---|---|
| 7,184,630 B2* | 2/2007 | Kwon | G02B 6/3692 385/52 |
| 2002/0001435 A1* | 1/2002 | Steinberg | G02B 6/30 385/52 |
| 2002/0051607 A1 | 5/2002 | Ido et al. | |
| 2006/0018602 A1* | 1/2006 | Park | G02B 6/136 385/129 |
| 2019/0243070 A1* | 8/2019 | Drake | G02B 6/12 |
| 2020/0258791 A1 | 8/2020 | Drake et al. | |

OTHER PUBLICATIONS

International Search Report and Written Opinion for PCT/EP2021/085239 dated Mar. 21, 2022, 13 pages.
U.K. Intellectual Property Office Examination Report, dated Sep. 6, 2023, for Patent Application No. GB2019591.3, 4 pages.

\* cited by examiner

US 12,554,066 B2

WAFER WITH BURIED V-GROOVE CAVITY FOR FIBER COUPLING

CROSS-REFERENCE TO RELATED APPLICATIONS

The present application is a U.S. National Phase Patent Application of International Application No. PCT/EP2021/085239, filed on Dec. 10, 2021, which claims priority to and the benefit of Great Britain Application No. 2019591.3, filed Dec. 11, 2020, the entire content of each of which is incorporated herein by reference.

FIELD

One or more aspects of embodiments according to the present disclosure relate to photonic integrated circuits, and more particularly to a system and method for forming fiber coupling features and photonic devices on a photonic integrated circuit.

BACKGROUND

A photonic integrated circuit may include various active and passive photonic devices, such as modulators, lasers, photodetectors, and waveguides, and may include features, such as V-grooves, for aligning optical fibers to waveguides on the photonic integrated circuit. V-grooves, however, may have high topography, and their presence may be an impediment to the reliable fabrication of photonic devices.

Thus, there is a need for an improved method of fabricating a photonic integrated circuit.

SUMMARY

According to an embodiment of the present invention, there is provided a method, including: bonding a first layer, to a top surface of a substrate, to form a composite wafer, the first layer being composed of a first semiconductor material, the substrate being composed of a second semiconductor material, the top surface of the substrate having a cavity, the cavity including a V-groove.

In some embodiments, after the bonding, the first layer forms a hermetic seal over the cavity.

In some embodiments: the first semiconductor material is crystalline silicon; the substrate includes a layer of silicon dioxide, on the top surface of the substrate; the second semiconductor material is crystalline silicon; and the bonding of the first layer to the top surface of the substrate includes bonding, to the top surface of the substrate, a sandwich including: the first layer, a second layer, composed of silicon dioxide, on the first layer, and a third layer, composed of silicon, on the second layer.

In some embodiments, the top surface of the substrate further has an alignment mark.

In some embodiments, the method further includes fabricating a photonic device on the composite wafer.

In some embodiments, the fabricating of the photonic device includes aligning a processing step with the alignment mark, using optical alignment with a wavelength of light capable of propagating through the first layer.

In some embodiments, the photonic device is an active photonic device.

In some embodiments, the photonic device is a buried inverted taper.

In some embodiments, the method further includes forming a first trench in the composite wafer, one wall of the first trench forming a waveguide facet.

In some embodiments, the forming of the first trench includes forming the first trench using a dry etch.

In some embodiments, the method further includes forming a second trench, the forming of the second trench including removing a non-V-groove portion at one end of the V-groove.

In some embodiments, the forming of the second trench includes forming the second trench using a saw cut.

In some embodiments, the forming of the second trench further includes forming a fiber stop wall, the fiber stop wall being a portion of one wall of the second trench.

In some embodiments, the method further includes forming an opening into the cavity through the first layer.

In some embodiments, the method further includes securing an optical fiber in the V-groove, the optical fiber being in contact with the two sloped walls of the V-groove.

In some embodiments, the method further includes forming a fiber stop wall, wherein the optical fiber is further in contact with the fiber stop wall.

According to an embodiment of the present invention, there is provided an article, including: a composite wafer, including: a substrate; and a first layer, on a top surface of the substrate, the first layer being composed of a first semiconductor material, the substrate being composed of a second semiconductor material, the top surface of the substrate having a cavity, the cavity including a V-groove.

In some embodiments, the method includes a sandwich including: the first layer, a second layer, composed of silicon dioxide, on the first layer, and a third layer, composed of silicon, on the second layer, wherein: the first semiconductor material is crystalline silicon; the substrate includes a layer of silicon dioxide, on the top surface of the substrate; and the second semiconductor material is crystalline silicon.

In some embodiments, the top surface of the substrate further has an alignment mark.

In some embodiments, the article further includes a photonic device on the composite wafer.

In some embodiments, the article further includes a trench in the composite wafer, one wall of the trench including a waveguide facet.

In some embodiments, the article further includes a trench in the composite wafer, one wall of the trench forming a fiber stop wall.

In some embodiments, the article further includes an opening in the first layer, over the V-groove.

In some embodiments, the first layer forms a hermetic seal over the cavity.

In some embodiments, the article further includes a fiber in the V-groove, and in contact with the fiber stop wall.

BRIEF DESCRIPTION OF THE DRAWINGS

These and other features and advantages of the present disclosure will be appreciated and understood with reference to the specification, claims, and appended drawings wherein:

Figure 1A:
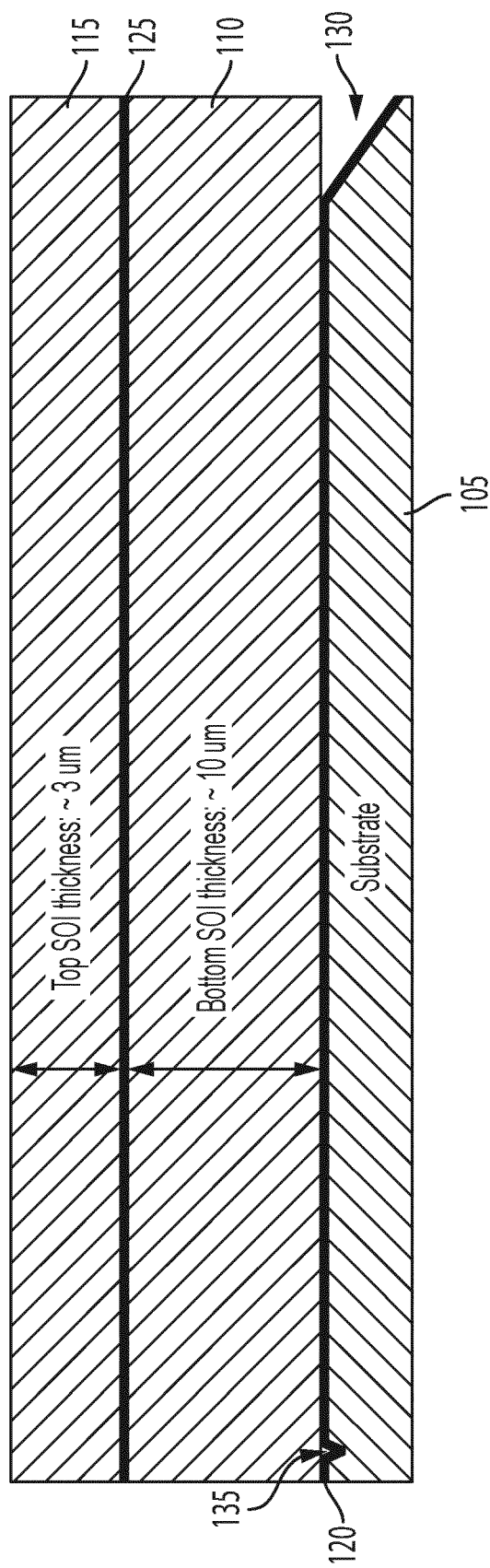
FIG. 1A is a schematic side cross-sectional view of a portion of an intermediate product in the fabrication of a photonic integrated circuit, according to an embodiment of the present disclosure.
Figure 1B:
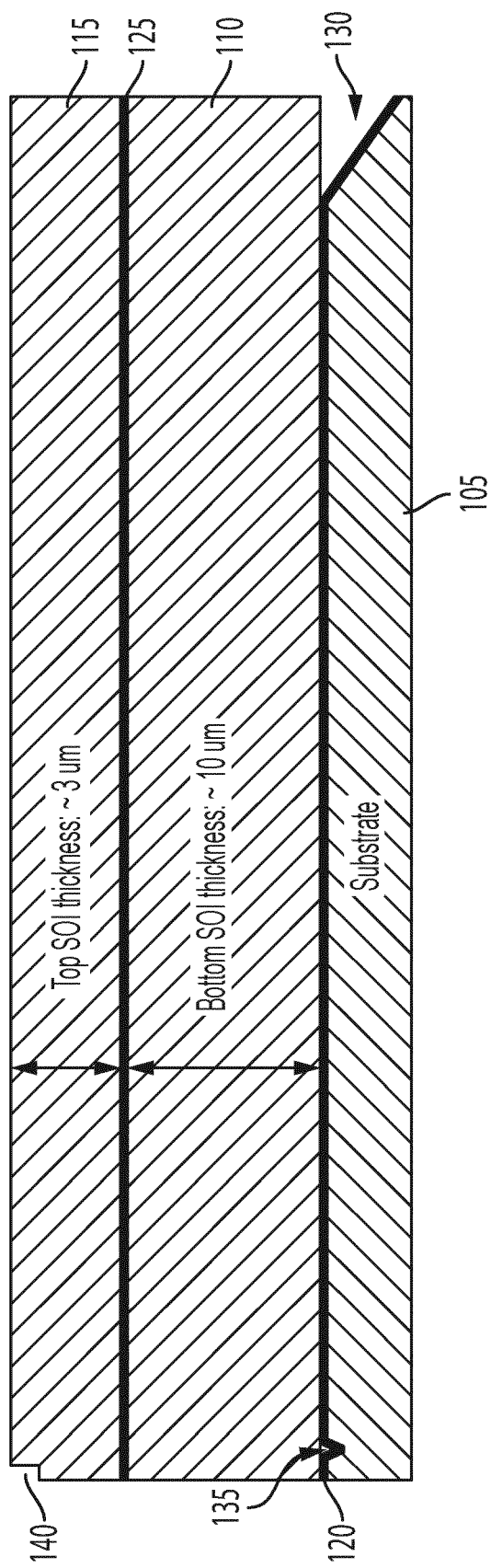
FIG. 1B is a schematic side cross-sectional view of a portion of an intermediate product in the fabrication of a photonic integrated circuit, according to an embodiment of the present disclosure.
Figure 1C:
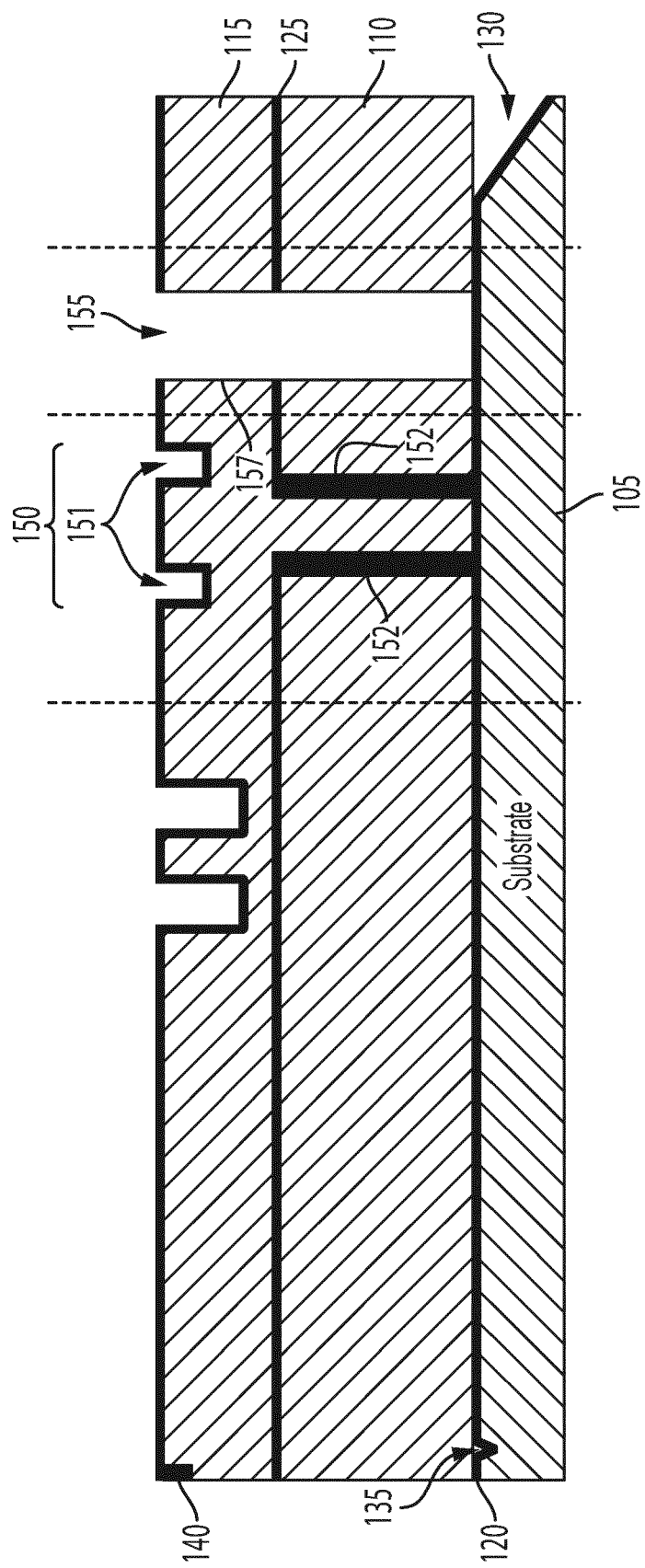
FIG. 1C is a schematic side cross-sectional view of a portion of an intermediate product in the fabrication of a photonic integrated circuit, according to an embodiment of the present disclosure.
Figure 1D:
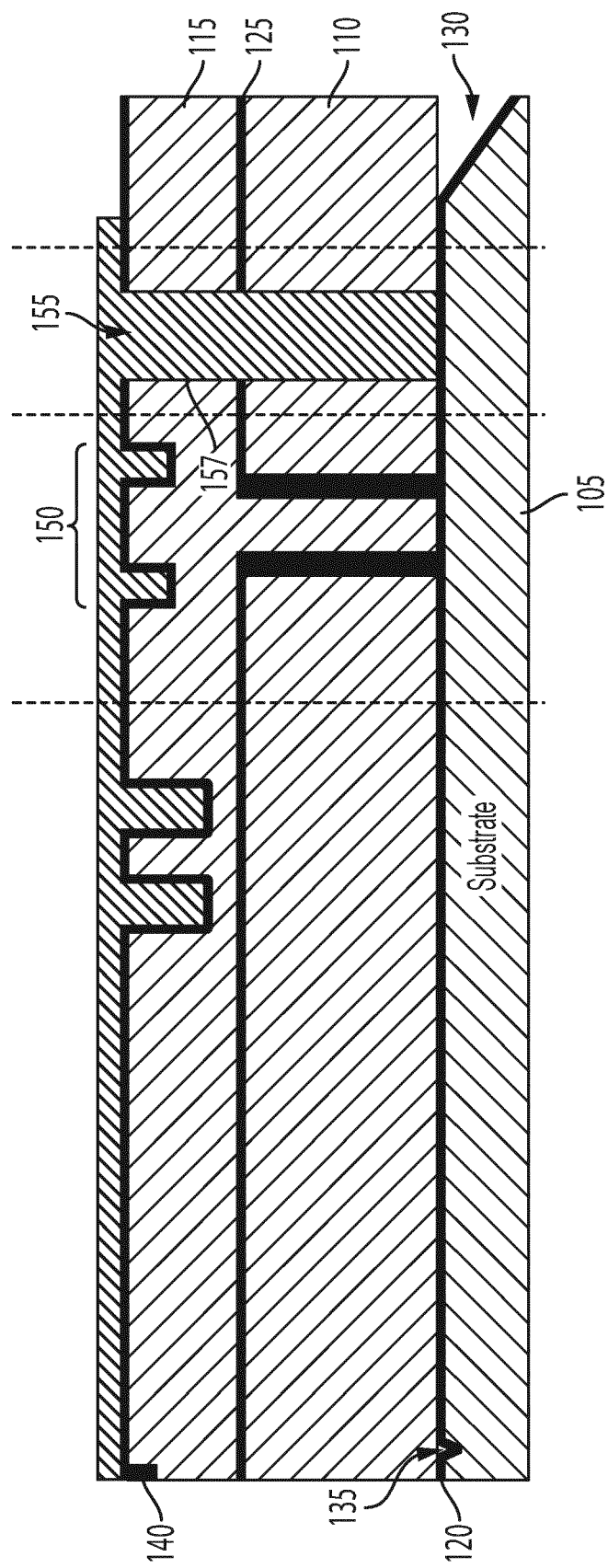
FIG. 1D is a schematic side cross-sectional view of a portion of an intermediate product in the fabrication of a photonic integrated circuit, according to an embodiment of the present disclosure.
Figure 1E:
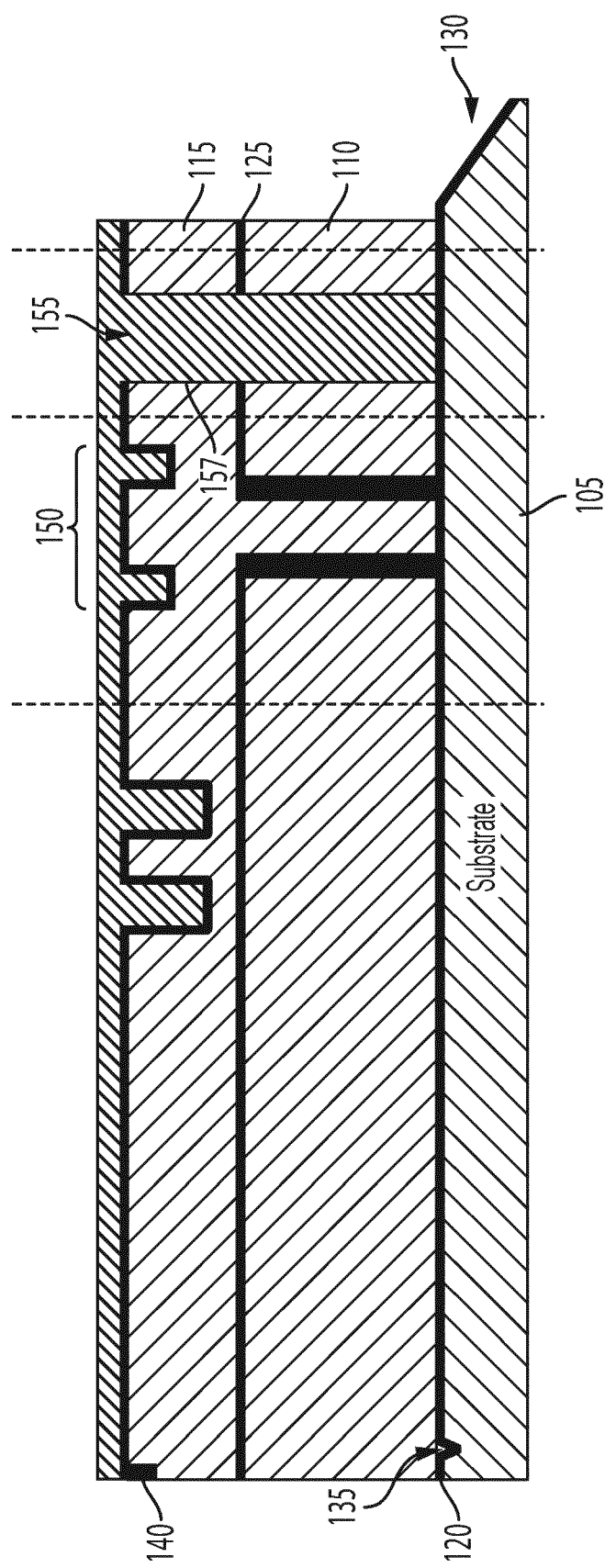
FIG. 1E is a schematic side cross-sectional view of a portion of an intermediate product in the fabrication of a photonic integrated circuit, according to an embodiment of the present disclosure.
Figure 1F:
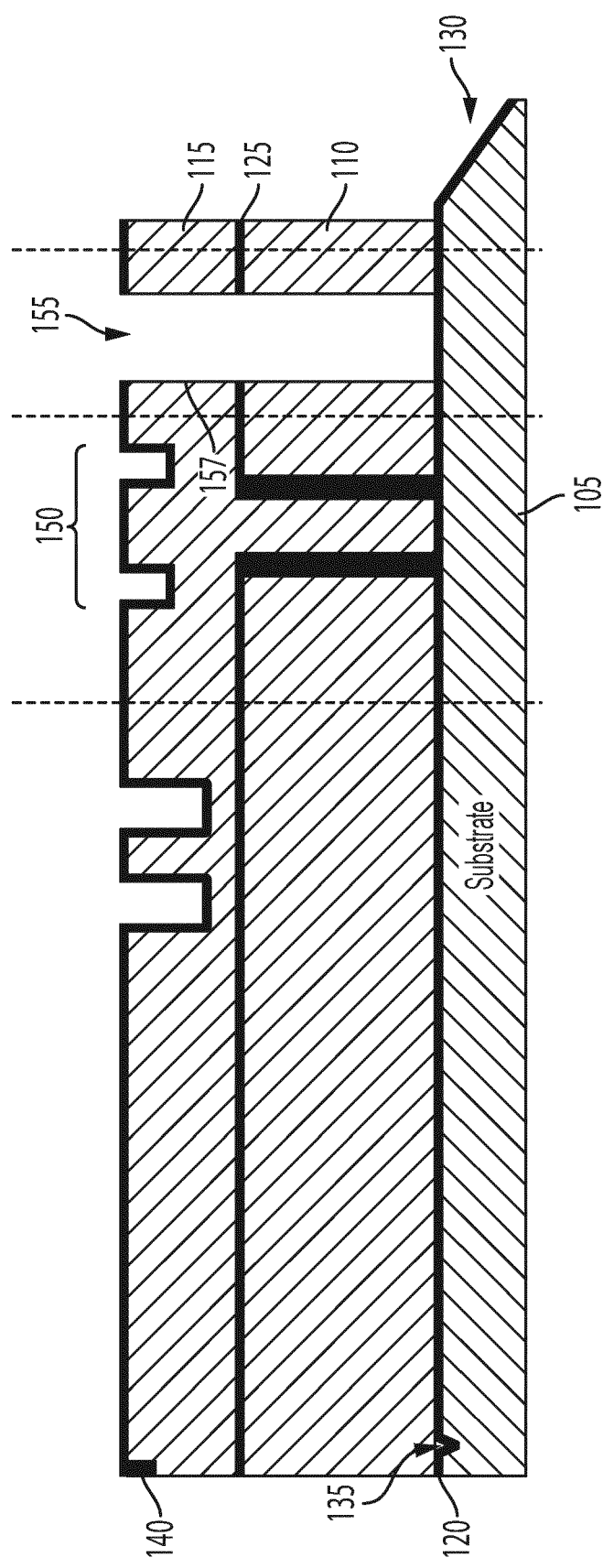
FIG. 1F is a schematic side cross-sectional view of a portion of an intermediate product in the fabrication of a photonic integrated circuit, according to an embodiment of the present disclosure.
Figure 1G:
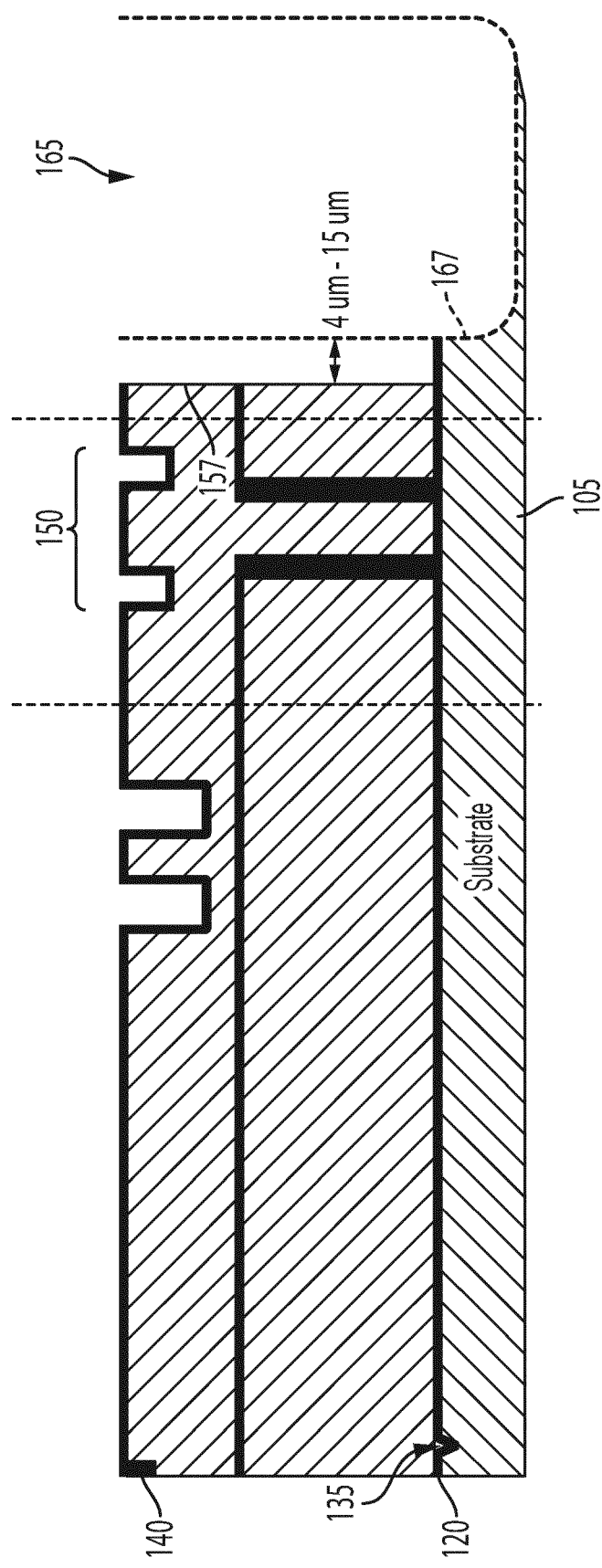
FIG. 1G is a schematic side cross-sectional view of a portion of an intermediate product in the fabrication of a photonic integrated circuit, according to an embodiment of the present disclosure.
Figure 1I:
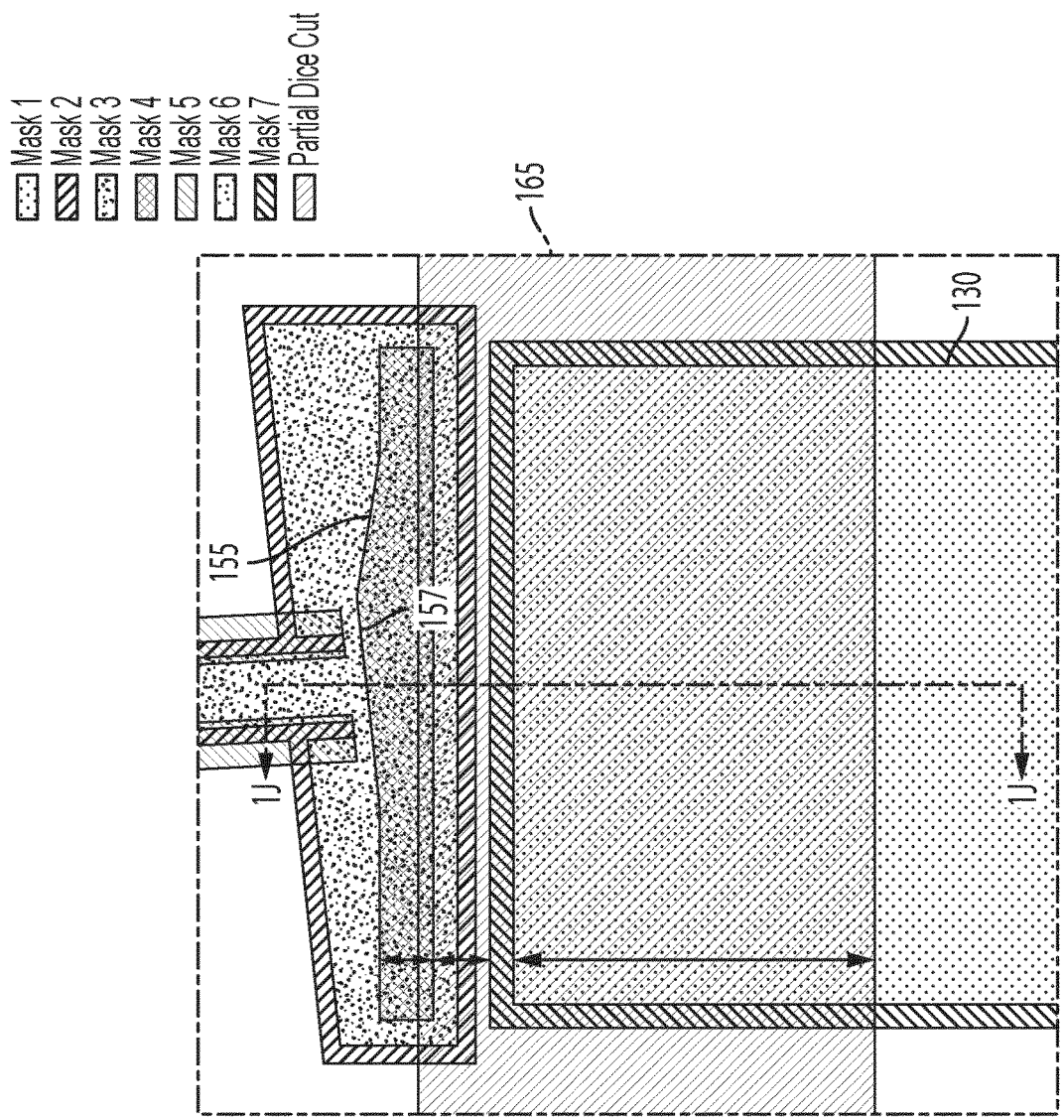
FIG. 1I is an enlarged view of a portion of the view of FIG. 1H, according to an embodiment of the present disclosure.
Figure 1H:
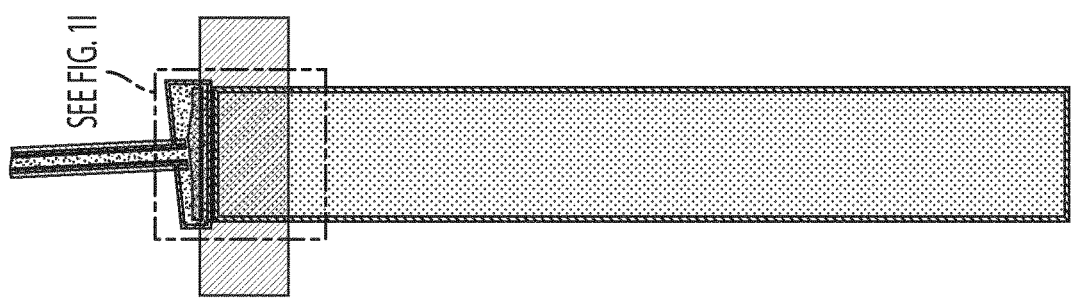
FIG. 1H is a top view of a portion of a photonic circuit, represented in a design format, according to an embodiment of the present disclosure.
Figure 1J:
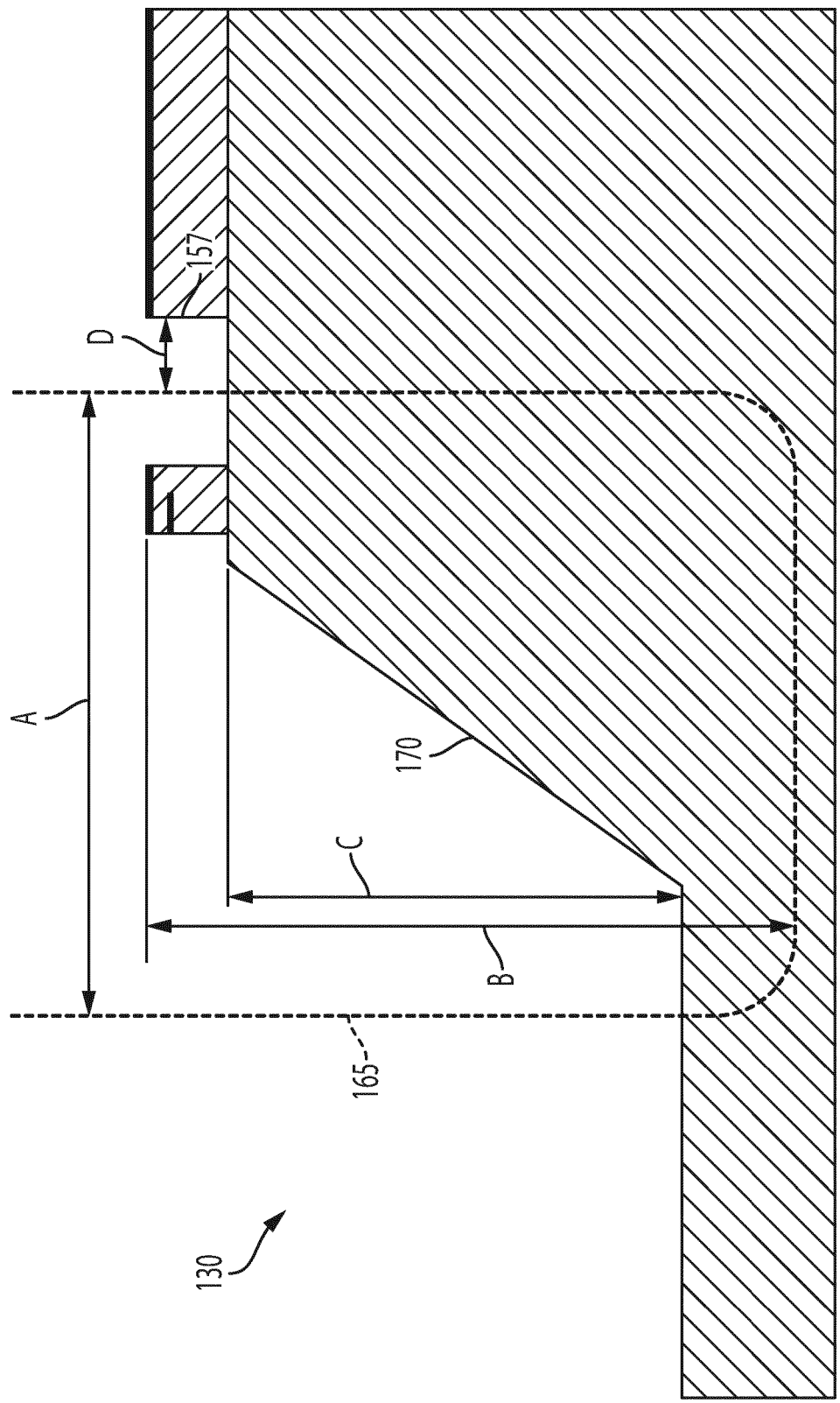
FIG. 1J is a side cross-sectional view of a portion of an intermediate product in the fabrication of a photonic integrated circuit, according to an embodiment of the present disclosure.

Each of FIGS. 1H, 1I, and 1J is drawn to scale.

DETAILED DESCRIPTION

The detailed description set forth below in connection with the appended drawings is intended as a description of exemplary embodiments of a wafer with a buried V-groove cavity provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Photonic integrated circuits (PICs), such as silicon photonic integrated circuits may include various photonic devices, e.g., passive photonic devices such as waveguides, and active photonic devices, e.g., lasers, photodetectors, or modulators. Light may be received by, or transmitted from, a photonic integrated circuit through an optical fiber (e.g., a single-mode fiber) that may be aligned and coupled to a waveguide on the photonic integrated circuit. The optical mode that propagates in a single-mode fiber may have a diameter of a few microns (e.g., between 5 and 15 microns), and, as such, it may be advantageous to align the fiber to the waveguide with an accuracy of a few microns or less.

Alignment of a fiber to a waveguide on the photonic integrated circuit may be performed in part by placing the end of the fiber in a V-groove on (e.g., at an edge of) the photonic integrated circuit, and securing it in place, e.g., with a plate, or "lid" placed over the fiber (and possibly also over other adjacent fibers), or by bonding it in place. The V-groove may constrain the position of the fiber in four degrees of freedom (the fiber remaining free in roll and in longitudinal translation). To constrain the position of the fiber in longitudinal translation, the fiber may also be pushed forward within the V-groove until the facet at the end of the fiber contacts a stop (e.g., a vertical wall, or "fiber stop wall") on the photonic integrated circuit.

The fabrication of a V-groove and of photonic devices on a photonic integrated circuit may, as mentioned above, be challenging in part because the V-groove may be a feature having high topography, e.g., the depth of the V-groove may be several tens of microns. The presence of features with high topography may interfere with processes used to fabricate the photonic devices, and may result in a degradation of the quality of the photonic devices or a reduction in yield. Moreover, when a V-groove is formed in the substrate of a double silicon on insulator (DSOI) wafer by first etching away the device and buried oxide (BOX) layers in the area of the substrate where the V-groove is to be formed, the accuracy with which the V-groove can be formed may be degraded by the nearby presence of the remainder of the device layers.

As such, in some embodiments, a cavity (or "V-groove cavity") having a portion that is a V-groove, is buried within the wafer during the fabrication of photonic devices, as described in further detail below. Referring to FIG. 1A, in some embodiments, a wafer for fabricating a photonic integrated circuit includes a substrate 105 (e.g., a silicon substrate), a lower silicon device layer 110, and an upper silicon device layer 115 on the lower silicon device layer 110. A lower silicon dioxide (or "oxide", or "buried oxide" (BOX)) layer 120 is on the substrate 105 (and under the lower silicon device layer 110) and an upper silicon dioxide layer 125 is on the lower silicon device layer 110 (and under the upper silicon device layer 115). As mentioned above, the substrate 105 may have a V-groove cavity 132 (FIG. 2C) a portion of which is a V-groove 130 (only a portion of the V-groove 130 being shown in FIG. 1A, for ease of illustration). The substrate 105 may also have an alignment mark 135, which may be a recess (e.g., a recess in the shape of a cross) in the top surface of the substrate 105. Although the present disclosure describes exemplary embodiments comprising silicon and silicon dioxide, the invention is not limited to such embodiments and analogous embodiments may be constructed based on other semiconductors (e.g., other semiconductors, such as InP, for which anisotropic etches are available). The present disclosure refers, for ease of description, to certain features in the singular (e.g., a V-groove cavity). In some embodiments, however, multiple photonic integrated circuits (e.g., multiple identical photonic integrated circuits) may be fabricated on a single wafer, each including one or more V-groove cavities, one or more photonic devices, and the like.

A wafer like that of FIG. 1A may be fabricated by first forming the V-groove cavity 132 and the alignment mark 135 in a crystalline silicon wafer, and then forming the lower silicon dioxide layer 120 (which will subsequently become a buried oxide ("BOX") layer) on the crystalline silicon wafer and bonding, to the crystalline silicon wafer (e.g. using fusion bonding), a sandwich including the lower silicon dioxide layer 120, the upper silicon dioxide layer 125, and the upper silicon device layer 115. After bonding, the top surface of the composite wafer (consisting of the substrate 105, the lower silicon device layer 110, the upper silicon device layer 115, and the oxide (or "buried oxide" (BOX)) layers 120, 125) may be ground and polished, and e-beam trimming may be employed if needed to further improve the flatness of the top surface or the uniformity of the thickness of the upper silicon device layer 115. The V-groove cavity 132 and the alignment mark 135 may be formed in a single etching step, or in separate patterning and etching steps. For each etching step a photoresist mask, or a photoresist mask and a hard mask (e.g., a silicon dioxide mask), may be used to define the edges of the V-groove cavity 132 or of the alignment mark 135, or both. The V-groove cavity 132 may be formed using a suitable anisotropic wet etch (e.g., a KOH etch). The alignment mark 135 may be formed by the same etching step as the V-groove cavity 132, or, if it is formed in separate etching step, the alignment mark 135 may be formed using any suitable etching process, including a dry (e.g., reactive ion) etch. Some embodiments described herein are based on a DSOI wafer, but the invention is not limited to such embodiments, and, for example, some embodiments instead are based on a silicon on insulator (SOI) wafer (having a single device layer); some such embodiments may include a top-surface taper instead of a buried inverted taper.

As mentioned above, in some embodiments the V-groove 130 is formed as part of a V-groove cavity 132 (FIG. 2C), using a mask with a rectangular opening, the rectangular opening having two longer edges and two shorter edges). As the etch progresses, a rectangular pit may be formed, having four sloping walls and a substantially flat bottom. The four sloping walls may include two longer walls (or "side walls" each extending to one of the two longer edges of the rectangle) and two shorter walls (or "end walls", each extending to one of the two shorter edges of the rectangle). The substantially flat bottom may become smaller, as the etch progresses, until eventually the two longer sloping walls meet at a line below the long centerline of the rectangle (i.e., below a line parallel to, and equidistant between, the two long edges of the rectangle). In this manner, the V-groove cavity 132 that is formed includes a V-groove 130 (e.g., the portion including the line where the two longer sloping walls meet) and may include a non-V-groove portion (such as a sloping end wall) at one or both ends of the V-groove 130. In some embodiments the opening in the mask is not rectangular but has another shape that includes two parallel edges for forming the V-groove portion of the V-groove cavity 132. In some embodiments, the etch is terminated before the two longer sloping walls have met, leaving a substantially flat portion in the bottom of the pit. In such an embodiment the cross-section of the V-groove portion of the pit is not strictly in the shape of a "V", and has a horizontal section joining the two sloping parts. Such a shape is nonetheless referred to herein as a "V-groove"; as used herein, a "V-groove" is any groove or trench having two sloping walls and having a shape (e.g., having a sufficiently small flat bottom) such that a section of single-mode fiber (e.g., a section of single mode fiber (i) having a diameter of 125 microns, and (ii) sufficiently short to fit between the two end walls, if present) may abut simultaneously against both of the sloping walls.

The composite wafer of FIG. 1A may then have formed on its top surface another alignment mark (e.g., another cross-shaped alignment mark), as illustrated in FIG. 1B. This additional alignment mark may be referred to as a front-side mark 140. The front-side mark 140 may be formed by etching (e.g., using a dry etch, which may produce sidewall verticality between 85 and 90 degrees), using a photoresist mask. The photoresist mask may be exposed using a mask aligned to the alignment mark 135 using infrared (IR) light, to which the silicon device layers 110, 115 and the silicon dioxide layers 120, 125 may be transparent. Once the front-side mark 140 has been formed, it may be used as the alignment reference for further fabrication steps, making it unnecessary to again perform infrared optical alignment to the alignment mark 135. Multiple alignment marks 135 and multiple front-side marks 140 may be present on the wafer, e.g., spaced across the wafer at the same pitch as, or at a different pitch from, the pitch of photonic integrated circuits on the wafer. In a top view, the alignment mark 135 may have the shape, for example, of a cross, or of a small square or of several small squares. In some embodiments, one or more alignment marks of a different kind may be present, and used, in addition to or instead of the buried alignment mark 135 shown, e.g., in FIG. 1A. For example, (i) the alignment mark may be in the substrate, like the buried alignment mark 135, but an opening may be etched in the device layers so that it is directly visible (i.e., visible without relying on the transparency (to IR light) of the upper and lower silicon device layers 115, 110, and of the BOX layers 120, 125), or (ii) the alignment mark may be in a "terrace" of the substrate, which may be a portion of the top surface of the substrate where, at the edge of the wafer, after edge grinding, it is not covered by the upper and lower silicon device layers 115, 110, and the BOX layers 120, 125, or (iii) the alignment mark may be on the back side of the wafer.

FIG. 1C shows a wafer after one or more photonic devices have been formed on it, including, in the example illustrated, a modulator 145, and a buried inverted taper 150. Also shown is a first trench 155, having a wall forming a waveguide facet 157, which may be formed at the same time as the photonic devices, or (to reduce the topography during fabrication of the photonic devices) after the fabrication of the photonic devices. The view of FIG. 1C (and of the similar drawings following FIG. 1C) is a composite schematic view in which several cross sections (separated by vertical dashed lines) have been combined into one view. Except for the first trench 155, each feature is shown as it would appear in a cross section taken along a cutting plane perpendicular to the direction of propagation of light. The first trench 155 is shown as it would appear in a cross section taken along a cutting plane parallel to the direction of propagation of light, and perpendicular to the plane of the substrate. The buried inverted taper may include a tapered rib waveguide portion (formed by two waveguide trenches 151) in the upper silicon device layer 115 and a tapered buried waveguide portion (in which light is confined by two oxide cladding walls 152 and by the lower silicon dioxide layer 120) in the lower silicon device layer 110. Each of these waveguide portions may be wide, at a first end of the buried inverted taper (at the waveguide facet 157, through which light may couple into the buried inverted taper from a fiber), and may become more narrow along the length of the buried inverted taper, with the width of the tapered buried waveguide portion becoming zero or nearly zero, so that, at a second end of the buried inverted taper, most of, or all of, the light propagates in a rib waveguide in the upper silicon device layer 115.

The buried, hermetically sealed V-groove cavity 132 that includes the V-groove 130 may then be opened, as illustrated for example in FIGS. 1D-1F. A photoresist mask 160 may be formed on the wafer (FIG. 1D), the silicon device layers 110, 115 and the silicon dioxide layers 120, 125 may be etched away where the photoresist is absent (including a region over the V-groove cavity 132) (FIG. 1E) and the photoresist may be removed (FIG. 1F). Wafer level probing (e.g., measuring of voltages on, or currents through, probes brought into contact with contact pads on the surface of the wafer) may then be done, e.g., to test electrical characteristics of active photonic devices on the photonic integrated circuit.

Referring to FIG. 1G, integration of the V-groove 130, the waveguide facet 157, and the buried inverted taper may then be performed using a saw cut (which may be referred to as a "partial dice cut") that does not extend all the way through the wafer, but instead forms a second trench 165 having a wall that forms a fiber stop wall 167 against which the fiber may abut, to set the longitudinal position of the fiber end. The horizontal separation between the waveguide facet 157 and the fiber stop wall 167 may be between 4 microns (um) and 15 microns, to ensure acceptable coupling of light between the fiber and the waveguide, and to avoid the end of the fiber contacting (and potentially damaging) the waveguide facet 157. In FIG. 1G, the second trench 165 is shown as it would appear in a cross section taken along a cutting plane parallel to the direction of propagation of light, and perpendicular to the plane of the substrate.

FIG. 1H is a top view of a photonic circuit, represented in a design format (in which some of the elements of the photonic circuit are drawn in the shapes of mask features that may be used to produce them), and FIG. 1I shows an enlarged cross-sectional view of a portion of FIG. 1H (the portion being identified by a dashed square labelled "SEE FIG. 1I" in FIG. 1H). It may be seen that in some embodiments the waveguide facet 157 is oblique to the second trench 165, and that the first trench 155 may accordingly have a non-uniform width. In the legend of FIG. 1I, Mask 1 is a mask layer for defining V-grooves and wet etched marks for IR alignment, Mask 2 is a mask defining a top SOI trench etch for the buried inverted taper (BIT) 150, Mask 3 is a mask for patterning the top BOX layer for the buried inverted taper 150, Mask 4 is a mask defining the trench etch in the bottom SOI layer for the buried inverted taper 150, Mask 5 is a waveguide definition layer, Mask 6 is a mask defining facet formation for the buried inverted taper 150 (formed with a 13 um etch), Mask 7 is a mask for SOI layer removal over the V-groove, and "Partial Dice Cut" is the shape of the region within which material is removed by the partial dice cut.

FIG. 1J is a cross-sectional view of a wafer taken along a cutting plane (illustrated as section line 1J-1J in FIG. 1I) parallel to the V-groove 130 and perpendicular to the second trench 165. As shown, the width of the second trench 165 (which may be referred to as the "diceline width", dimension A in FIG. 1J) may be between 90 microns and 120 microns (e.g., 110 microns as drawn), the depth of the second trench 165 (which may be referred to as the "diceline depth", dimension B in FIG. 1J) may be between 115 microns and 130 microns (e.g., 115 microns as drawn), the depth of the V-groove 130 (dimension C in FIG. 1J) may be between 75 microns and 85 microns (e.g., 80 microns as drawn), and the horizontal distance between the waveguide facet 157 and the second trench 165 (dimension D in FIG. 1J) may be between 4 microns and 15 microns (e.g., 13 microns as drawn). FIG. 1J shows one sloping end wall (which may be referred to as the "the near sloping end wall" 170) at the end of the V-groove 130 that is near the waveguide facet 157 (the other sloping end wall, at the other end of the V-groove 130, may be referred to as the "the far sloping end wall" 171 (FIG. 2C)).

Figure 2A:
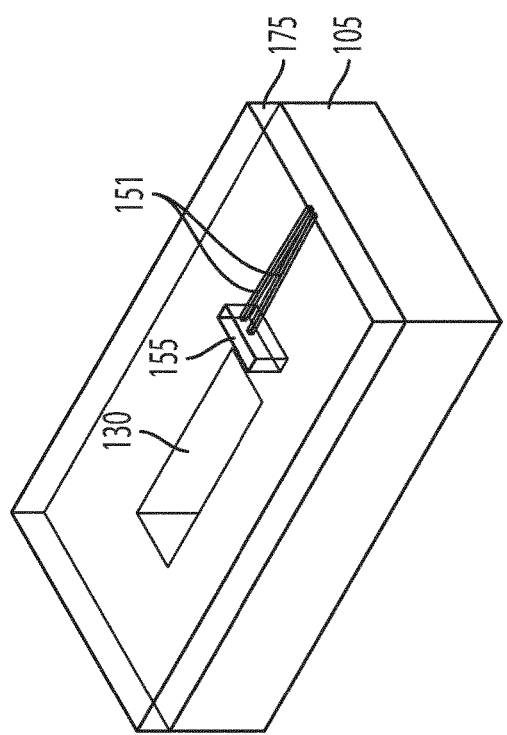
FIG. 2A is a perspective view of a portion of an intermediate product in the fabrication of a photonic integrated circuit.
Figure 2B:
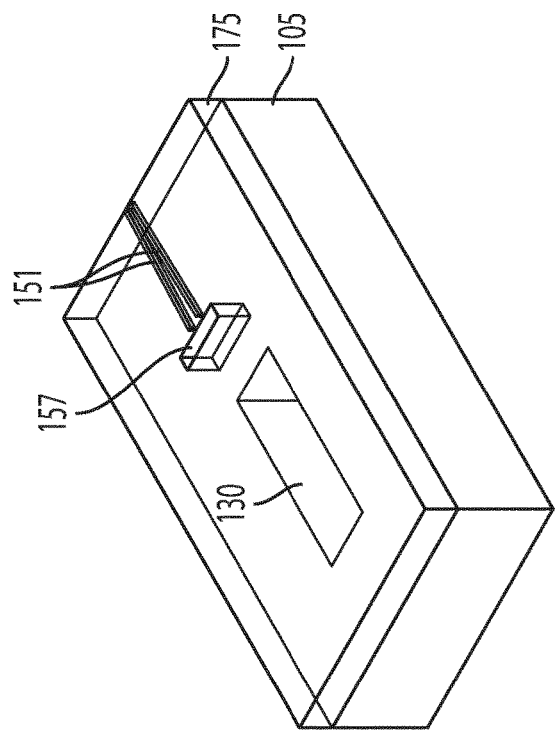
FIG. 2B is a perspective view of a portion of an intermediate product in the fabrication of a photonic integrated circuit.
Figure 2C:
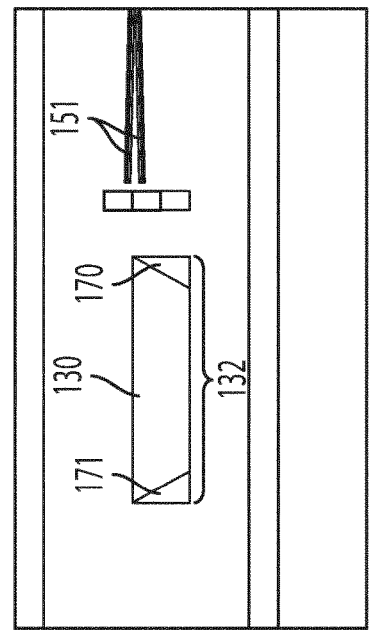
FIG. 2C is a perspective view of a portion of an intermediate product in the fabrication of a photonic integrated circuit.
Figure 2E:
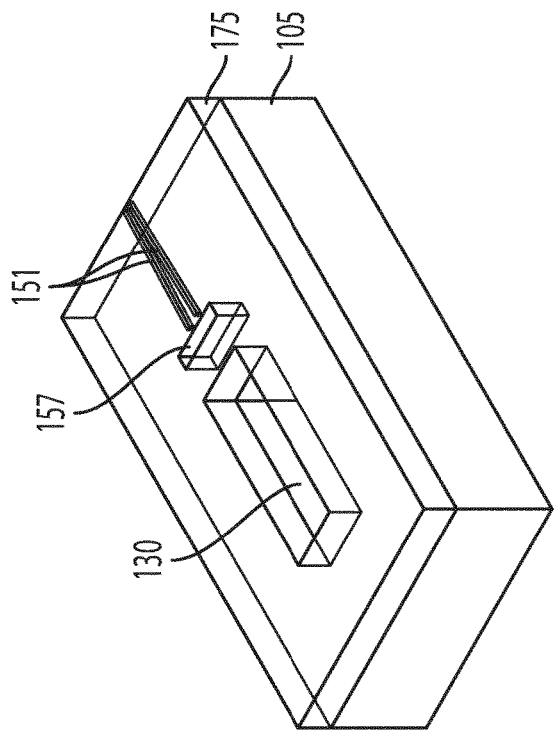
FIG. 2E is a perspective view of a portion of an intermediate product in the fabrication of a photonic integrated circuit.
Figure 2D:
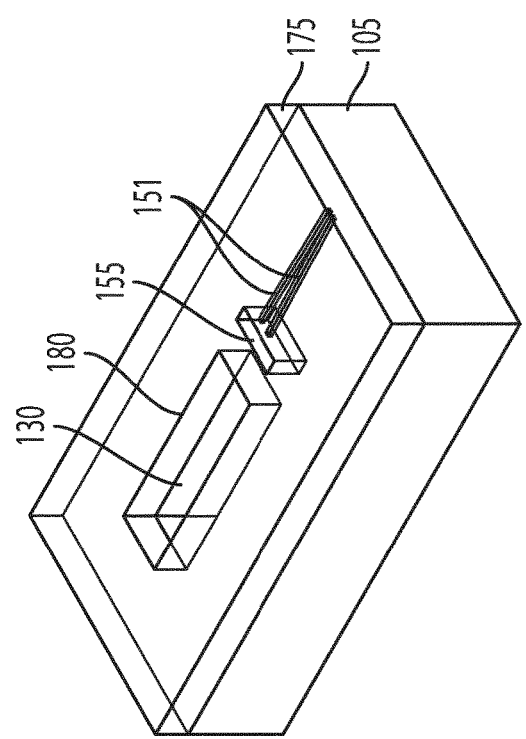
FIG. 2D is a perspective view of a portion of an intermediate product in the fabrication of a photonic integrated circuit.
Figure 2F:
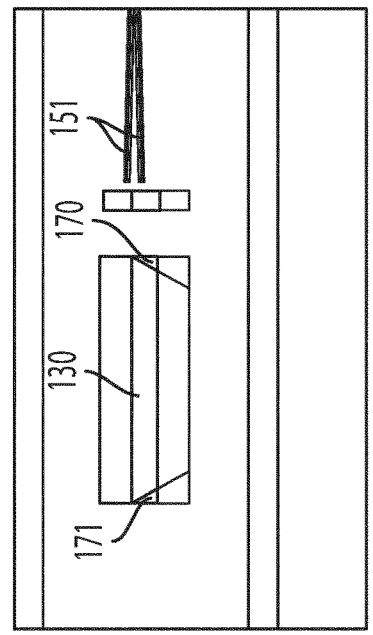
FIG. 2F is a perspective view of a portion of an intermediate product in the fabrication of a photonic integrated circuit.
Figure 2H:
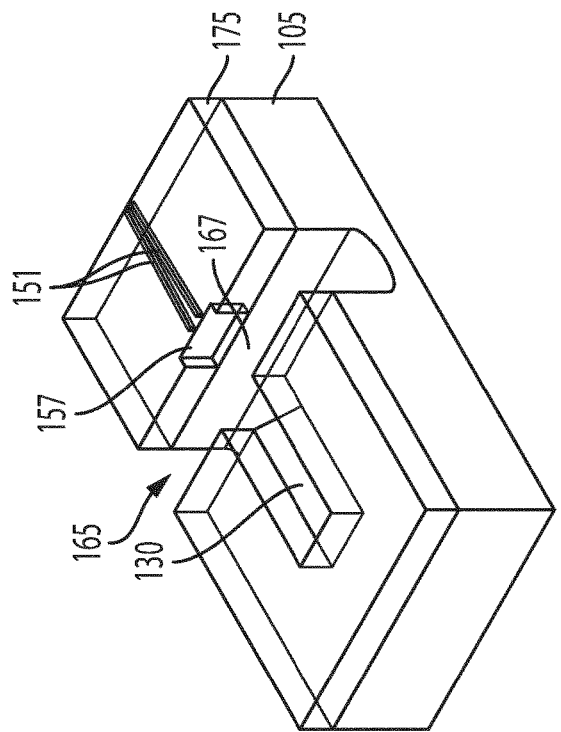
FIG. 2H is a perspective view of a portion of an intermediate product in the fabrication of a photonic integrated circuit.
Figure 2I:
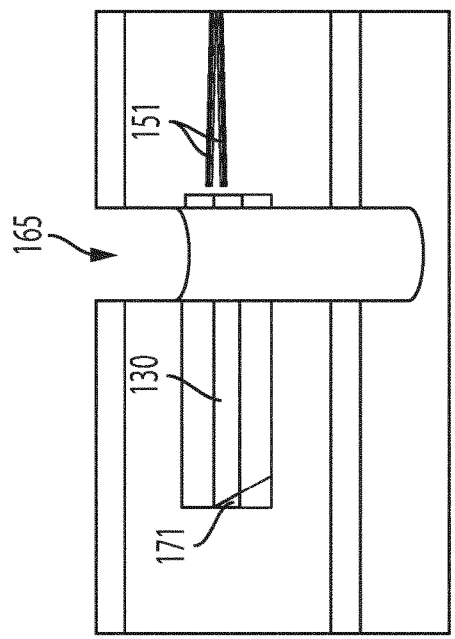
FIG. 2I is a perspective view of a portion of an intermediate product in the fabrication of a photonic integrated circuit.
Figure 2G:
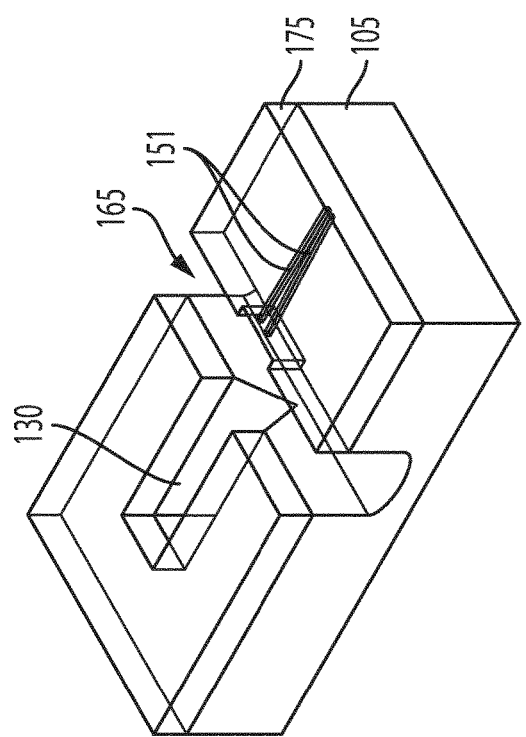
FIG. 2G is a perspective view of a portion of an intermediate product in the fabrication of a photonic integrated circuit.
Figure 2K:
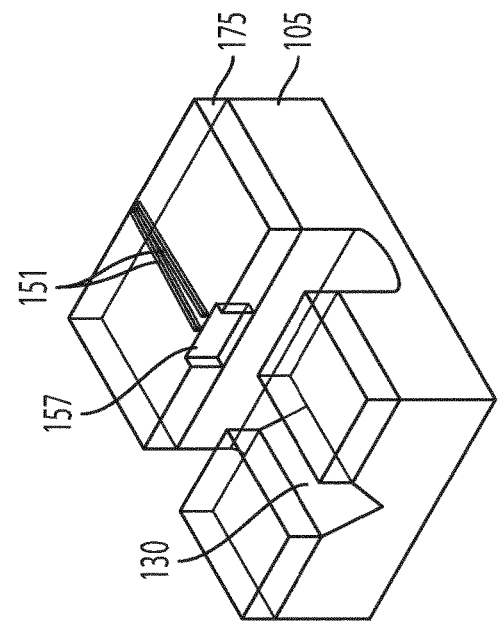
FIG. 2K is a perspective view of a portion of an intermediate product in the fabrication of a photonic integrated circuit.
Figure 2J:
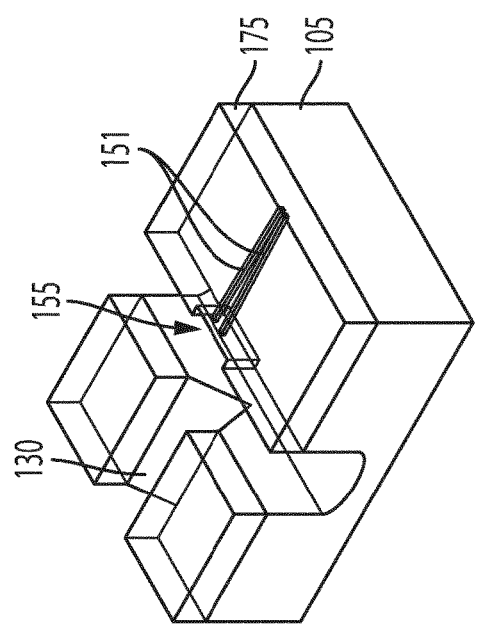
FIG. 2J is a perspective view of a portion of an intermediate product in the fabrication of a photonic integrated circuit.
Figure 2L:
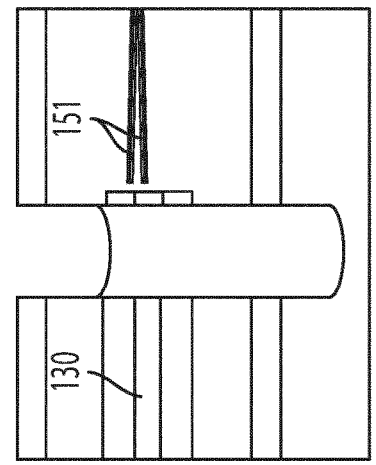
FIG. 2L is a perspective view of a portion of an intermediate product in the fabrication of a photonic integrated circuit.
Figure 2N:
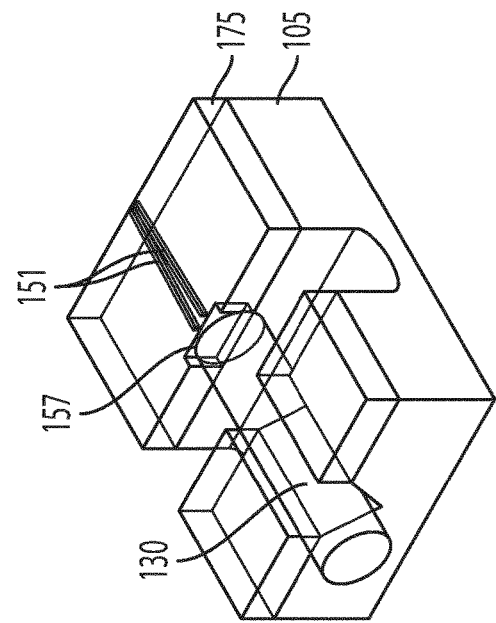
FIG. 2N is a perspective view of a portion of an intermediate or final product in the fabrication of a photonic integrated circuit.
Figure 2M:
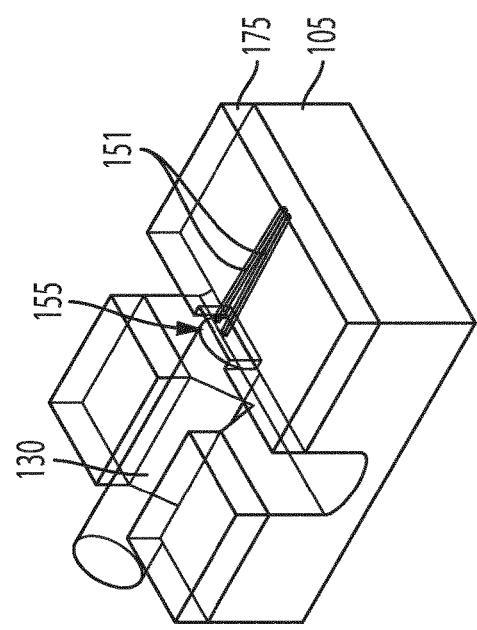
FIG. 2M is a perspective view of a portion of an intermediate or final product in the fabrication of a photonic integrated circuit.
Figure 2O:
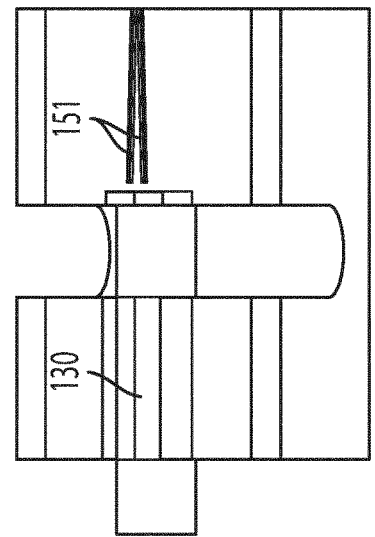
FIG. 2O is a perspective view of a portion of an intermediate or final product in the fabrication of a photonic integrated circuit.

Each of FIGS. 2A-2O is a perspective view of a portion of an intermediate product in the fabrication of a photonic integrated circuit, in some embodiments. For ease of illustration, the layers on the substrate are drawn transparent, only a single layer is shown on the substrate 105 (instead of the silicon device layers 110, 115 and the silicon dioxide layers 120, 125 being drawn separately), and the oxide cladding walls 152 of the buried waveguide portion are not shown. FIGS. 2A-2C show an intermediate product in which a V-groove cavity 132 (including a V-groove 130) is covered, by one or more layers (e.g., by the silicon device layers 110, 115 and the silicon dioxide layers 120, 125, shown in FIGS. 2A-2O as a single "cover layer" 175). The top surface of the intermediate product of FIG. 2A-2C has little topography (the intermediate product that exists before the formation of the first trench 155 has even less topography), and, e.g., it lacks the high topography that would be present if an open V-groove were present on the top surface. The V-groove cavity 132 is hermetically sealed, reducing the risk of infiltration of liquid that may cause problems in subsequent processing steps, or contamination, e.g., with particles that could compromise fiber alignment.

FIGS. 2D-2F show an intermediate product in which an opening 180 (e.g., a rectangular opening, as shown) has been formed in the cover layer 175, exposing the V-groove 130. The width of the opening may be sufficiently large that a fiber placed in the V-groove 130 will not contact the cover layer 175 (e.g., the width of the opening may be approximately the same as the width of the V-groove 130). The lithography step used to form the opening 180 may be the last lithography step used in the fabrication of the photonic integrated circuit. FIGS. 2G-2I show an intermediate product in which the second trench 165 has been formed (e.g., using a partial dice cut), removing the near sloping end wall 170 and providing a clear path between the interior of the V-groove 130 (where the fiber will be placed) and the waveguide facet 157. FIGS. 2J-2L show an intermediate product in which the photonic integrated circulated has been separated from the wafer by a blade dicing operation which singulates the photonic integrated circuits on the wafer into separate chips. This blade dicing operation may also remove the far sloping end wall 171, as shown. FIGS. 2M-2O show an intermediate or final product in which an optical fiber 185 has been placed in the V-groove 130, at a position at which it abuts against the fiber stop wall 167.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component. The term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a wafer with a buried V-groove cavity have been specifically described and illustrated herein, many modifications and variations will be apparent to those skilled in the art. Accordingly, it is to be understood that a wafer with a buried V-groove cavity constructed according to principles of this disclosure may be embodied other than as specifically described herein. The invention is also defined in the following claims, and equivalents thereof.

What is claimed is:
1. A method, comprising:
 bonding a sandwich structure, to a top surface of a substrate, to form a composite wafer,
 the sandwich structure comprising:
  a first layer composed of crystalline silicon;
  a second layer composed of silicon dioxide and directly above the first layer; and
  a third layer composed of crystalline silicon and directly above the second layer, the substrate comprising:
- a base layer composed of crystalline silicon; and
- a top layer composed of silicon dioxide and defining the top surface of the substrate, the top surface of the substrate having:
- a cavity comprising a V-groove; and
- a first alignment mark comprising a recess, the method further comprising:
- forming the cavity and the recess in a top surface of the base layer;
- forming the top layer of silicon dioxide on the base layer after forming the cavity and the recess in the top surface of the base layer;
- forming a first trench in the composite wafer, one wall of the first trench forming a waveguide facet;
- etching a second alignment mark, aligned with the first alignment mark, into a top surface of the third layer after the composite wafer is formed and using optical alignment with a wavelength of light capable of propagating through the sandwich structure; and
- fabricating a photonic device in the sandwich structure after the composite wafer is formed.

2. The method of claim 1, wherein, after the bonding, the first layer forms a hermetic seal over the cavity.

3. The method of claim 1, wherein the photonic device is an active photonic device.

4. The method of claim 1, wherein the photonic device is a buried inverted taper.

5. The method of claim 1, wherein the forming of the first trench comprises forming the first trench using a dry etch.

6. The method of claim 1, further comprising forming a second trench, the forming of the second trench comprising removing a non-V-groove portion at one end of the V-groove.

7. The method of claim 6, wherein the forming of the second trench comprises forming the second trench using a saw cut.

8. The method of claim 6, wherein the forming of the second trench further comprises forming a fiber stop wall, the fiber stop wall being a portion of one wall of the second trench.

9. The method of claim 1, further comprising forming an opening into the cavity through the first layer, the second layer, and the third layer.

10. The method of claim 1, further comprising securing an optical fiber in the V-groove, the optical fiber being in contact with two sloped walls of the V-groove.

11. The method of claim 10, further comprising forming a fiber stop wall,
wherein the optical fiber is further in contact with the fiber stop wall.

12. An article, comprising:
a composite wafer, comprising:
  a substrate, comprising:
    a base layer composed of crystalline silicon; and
    a top layer composed of silicon dioxide and defining a top surface of the substrate, and
  a sandwich structure, comprising:
    a first layer composed of crystalline silicon and on the top surface of the substrate;
    a second layer composed of silicon dioxide and directly above the first layer; and
    a third layer composed of crystalline silicon and directly above the second layer,
the top surface of the substrate having:
  a cavity comprising a V-groove; and
  a first alignment mark comprising a recess in a top surface of the base layer, the top layer covering the recess,
the composite wafer having a first trench, one wall of the first trench forming a waveguide facet,
the third layer having an etched second alignment mark in a top surface thereof and aligned with the first alignment mark, the sandwich structure being optically transparent at a wavelength of light capable of propagating through the sandwich structure, and
the sandwich structure comprising a photonic device.

* * * * *